United States Patent [19]
Olofson

[11] Patent Number: 5,598,295
[45] Date of Patent: Jan. 28, 1997

[54] MICROSCOPE SLIDE WITH CONTRASTING SURFACES ON OPPOSITE SIDES

[75] Inventor: Randie R. Olofson, Stratham, N.H.

[73] Assignee: Erie Scientific Company, Portsmouth, N.H.

[21] Appl. No.: 505,015

[22] Filed: Jul. 21, 1995

[51] Int. Cl.$^6$ .................................................. G02B 21/34
[52] U.S. Cl. ........................... 359/398; 359/391; 359/396
[58] Field of Search .................................. 359/391, 392, 359/393, 394, 395, 396, 397, 398; 356/376, 244, 422

[56] References Cited

U.S. PATENT DOCUMENTS

| | | | |
|---|---|---|---|
| 3,620,596 | 11/1971 | Binnings | 350/95 |
| 3,912,360 | 10/1975 | Beckel | 350/92 |
| 4,087,154 | 5/1978 | Menzel | 350/92 |
| 4,190,314 | 2/1980 | Goldsmith | 350/94 |
| 4,481,246 | 11/1984 | Melisz et al. | 428/210 |
| 4,624,882 | 11/1986 | Melisz et al. | 428/210 |
| 4,679,914 | 7/1987 | Rosenberg | 350/534 |
| 4,790,640 | 12/1988 | Nason | 350/534 |
| 5,006,789 | 4/1991 | Williamson | 324/96 |
| 5,089,315 | 2/1992 | Rosenberg | 428/192 |
| 5,095,213 | 3/1992 | Strongin | 250/459.1 |
| 5,111,344 | 5/1992 | Robinson, Jr. | 359/900 |

*Primary Examiner*—Timothy P. Callahan
*Assistant Examiner*—My-Trang Nu Ton
*Attorney, Agent, or Firm*—Wood, Herron & Evans, P.L.L.

[57] ABSTRACT

A microscope slide having on a first side an opaque, scratchable coating located at a marking region of the slide, and on a second opposing side located generally behind the scratchable coating at the marking region, a contrastingly-colored coating. Upon scribing an identification mark into the scratchable coating and thus removing the scratchable coating where scribed, the contrastingly-colored coating on the second side of the slide becomes visible from the first side of the slide in the area scribed.

26 Claims, 1 Drawing Sheet

MICROSCOPE SLIDE WITH CONTRASTING SURFACES ON OPPOSITE SIDES

FIELD OF THE INVENTION

This invention relates generally to a microscope slide and more particularly to a microscope slide having a marking region which can be marked with a conventional marker, such as a pen or pencil, and/or scribed with a pointed scribing instrument, with both the scribed mark and the pen or pencil mark exhibiting a high degree of visibility.

BACKGROUND AND BRIEF SUMMARY OF THE INVENTION

Typical microscope slides of the prior art include a "frosted" portion as a marking surface. This frosted area is created by sandblasting, acid etching, mechanical abrading, or other methods of roughening the surface of the glass so that a permanent marking surface is created to accept a marking by a pen, pencil, or other marking instrument. All of these techniques create a frosted surface by removing material from the glass surface, therefore necessarily resulting in a marking surface which is recessed from, or certainly no higher than, the surface of the glass. Furthermore, such frosted glass, while providing a matte surface on the glass, does not result in a marking surface having a pronounced background to contrast with information to be written thereon.

"Double frosted" or "double etched" slides, having such marking surfaces on both sides of the slide, are also known to the prior art.

The prior art also includes slides having a marking surface formed of a coating of resinous material which is pigmented and porous, and dries to a matte finish. The porosity of the resinous material makes it receptive to marking while the pigmentation enhances visibility of such marking. U.S. Pat. No. 4,481,246 discloses a slide of this type having a raised marking surface formed of pigmented resinous material, such as an epoxy resin, which dries to a matte finish and is absorptive and retentive of marking ink.

U.S. Pat. No. 4,679,914 discloses a microscope slide having on one side a frosted marking surface, and on the opposite side a raised resinous marking surface which is a) absorptive and receptive to marking materials, b) pigmented to provide a visual contrast to such marking surface, c) resistant to a variety of laboratory solvents, reagents, stains or chemicals, and d) susceptible of being produced in a variety of colors to facilitate color coding. Thus, the slide disclosed in the '914 patent has a writing surface on both sides of the slide, one being a raised resinous marking surface and the other being a frosted marking surface.

An object of this invention is to provide a microscope slide having contrastingly colored coatings on opposite sides which are positioned generally behind each other at a marking region of the slide such that the contrasting coatings are in an overlying relationship with each other, and in which at least one of the contrasting coatings is opaque and scratchable with a pointed scribe so that upon scribing, the scratchable coating is removed and the contrastingly colored coating from the opposite side of the slide is visible through the scribed area of the scratchable coating providing a high level of contrast for the scribed marking. At least one of the coatings, such as the scratchable coating, can also be marked with a pen, pencil or the like if desired. In a preferred form of the invention, each of the contrastingly colored coatings is pigmented and the coating on the side opposite to the scratchable coating is opaque.

DETAILED DESCRIPTION OF THE INVENTION

Figure 1:
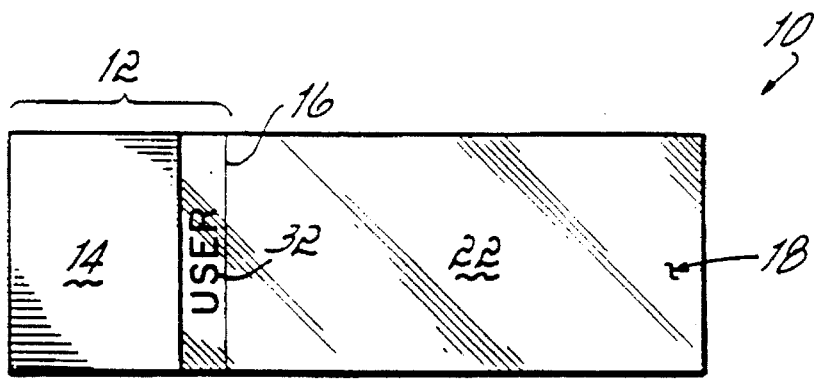
FIG. 1 is a top plan view of the microscope slide in accordance with a preferred embodiment of this invention.
Figure 2:
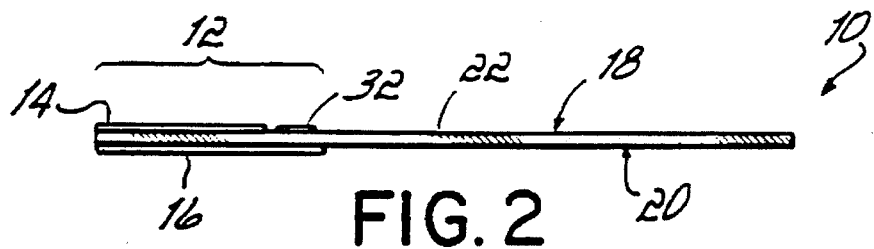
FIG. 2 is front elevation view of the microscope slide of FIG. 1.

With reference to FIGS. 1 and 2, a preferred embodiment of a glass microscope slide 10 of this invention is shown having conventional length, width and thickness. At a first end 12 of slide 10 is a generally opaque, and preferably pigmented, colored coating 14 and a contrastingly colored, and preferably pigmented, coating 16 positioned on opposite sides 18 and 20 respectively of slide 10. Most preferably, coating 16 is also opaque. Coatings 14 and 16 are located in general alignment in an overlying/underlying relationship. Both coatings 14 and 16 are generally inert to typical laboratory chemicals such as solvents, fixatives and cleaners so that coatings 14 and 16 do not dissolve off of slide 10 when in contact with solvents.

Coating 14 on side 18 of slide 10 is preferably formed in accordance with the teachings of U.S. Pat. No. 4,481,246 in the names of Jellinek and Melisz, entitled "Microscope Slide with Raised Marking Surface," the entire disclosure of which is incorporated herein by reference. More particularly, coating 14 is formed from a raised coating of an epoxy or other resinous material. This epoxy may include pigments to give coating 14 a particular color. Colors may be darker such as red or green, or lighter such as white, tan, yellow or light blue etc. The epoxy or other resinous material includes a granular medium to impart porosity and a permanent matte finish to the coating for accepting a marking thereon if desired. Coating 14 accepts markings from all commonly used laboratory marking instruments such as felt-tip marking pens, india ink, ballpoint pen ink, and pencil. Coating 14 forms an absorptive surface capable of holding and retaining the marking through laboratory procedures in which laboratory solvents and chemicals are commonly used. Coating 14 generally has and maintains a finite thickness, and is therefore raised in relation to the remaining glass surface 22 of slide 10.

Figure 3:
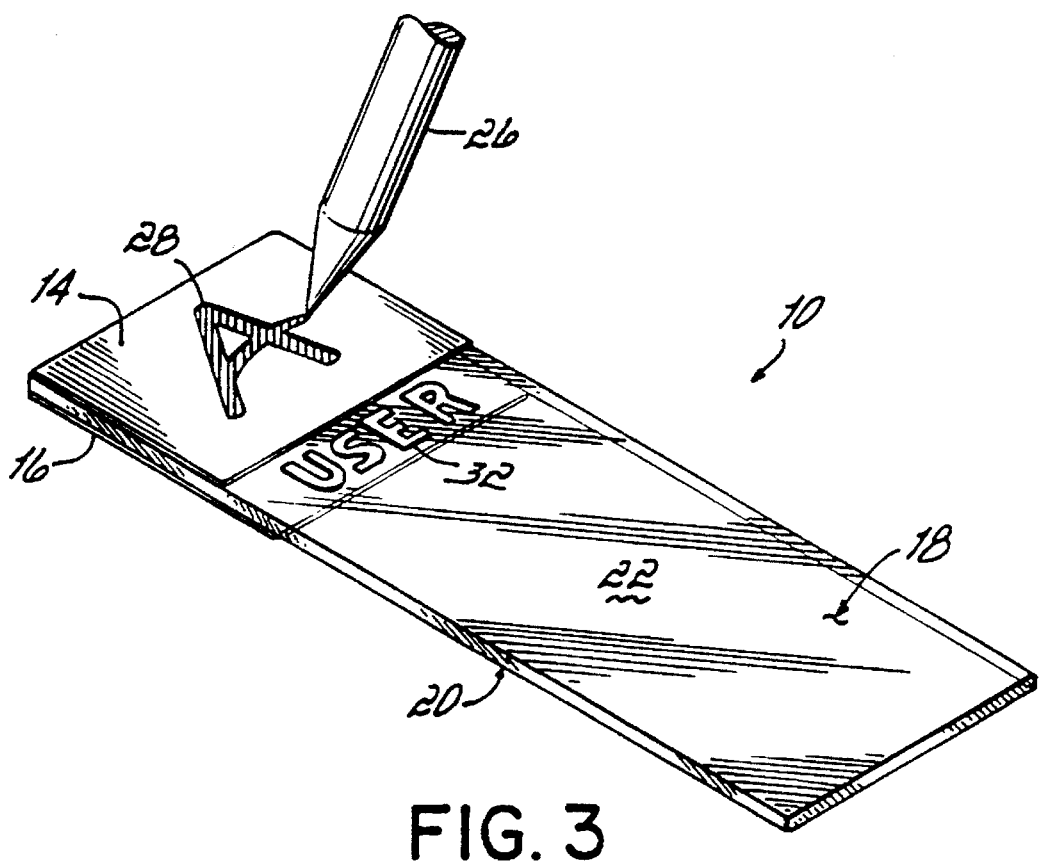
FIG. 3 is a perspective view of the microscope slide of FIG. 1 being scribed.

Coating 16, which is preferably pigmented and most preferably opaque also, on second side 20 of slide 10 positioned generally behind coating 14 of first side 18 of slide 10, in the preferred embodiment, is formed primarily of a thermally cured epoxy material, which is the same epoxy material in coating 14 of first side 18 of slide 10. Of course, other suitable functionally equivalent materials may be used. Coating 16 on second side 20 of slide 10 preferably incorporates different pigments to provide to the respective coating 16 a color which contrasts with the color of coating 14 on first side 18 of slide 10. For example, opaque coating 14 on first side 18 may be white while coating 16 on second side 20 may be red (as shown in FIG. 3), resulting in sharply contrasting pigmented coatings 14 and 16. Coating 16 differs in chemical composition from coating 14 such that coating 16 cannot be written upon or retain a mark from a conventional writing instrument.

While coating 14 may be marked upon with conventional marking pens, pencils etc., coating 14 is also scratchable such that it can be removed by scribing with a pointed scribe 26 as shown in FIG. 3. Upon scribing scratchable coating 14 with a pointed scribe 26, coating 14 is removed where scribed at indicia 28 from respective side 18 of slide 10 so that contrastingly colored coating 16 is visible from side 20 of slide 10 at the scribed area. Thus, if coating 14 is white and coating 16 is red, upon scribing an identifying mark 28 on white coating 14, red coating 16 is visible from side 18 of white coating 14 in the area scribed 28. Identifying mark 28 would therefore appear red from side 18, surrounded by contrasting unscribed white coloration from coating 16.

It is preferable to have coating 14 made of a light color and coating 16 of a dark color so that coating 14, in addition to being scribed as noted above, can be written upon visibly in a conventional manner, such as with a pen, pencil etc. If coating 14 were dark-colored, a marking written thereon in pencil would be difficult to see. However, coating 14 may be dark-colored if desired, just as long as coating 16 visually contrasts with coating 14 when coating 14 is scribed.

Optimally, both coatings 14 and 16 are pigmented and also generally opaque, as noted above, to facilitate the degree of visual contrast between coatings 14 and 16. If the coatings 14 and 16 were too translucent, the color of coating 14 on the first side 18 of slide 10 would be undesirably visible through the second side 20 of slide 10, and vice versa.

Side 18 may have a personal identification mark 32, such as the name of the user, spaced apart from coating 14, preferably about 1 millimeter from the adjacent edge of coating 14. Personal identification mark 32 is comprised of the same epoxy material as is coating 14, and is preferably the same color as coating 14 on side 18 of slide 10. While coatings 14 and 16 are generally positioned directly behind each other in an overlying relationship on opposite sides 18 and 20 of slide 10, coating 16 may be extended beyond coating 14 about 2 millimeters to a position behind personal identification mark 32 so as to contrast therewith and to make personal identification mark 32 more visible.

While coating 14 may be both written upon with conventional markers i.e., pen, pencil etc., and scribed for identification purposes, such writing may be difficult to see on certain colors, especially dark colors, and such writing may smear if touched before it dries. It will therefore be appreciated that by scribing the scratchable coating of a pair of color-contrasting coatings, a slide can easily and more clearly be identified with marking indicia. While this invention provides a coating 14 that may be written upon with a conventional pen, pencil etc., it further provides the option of scribing this same coating 14 for identification purposes which because of the underlying contrastingly colored coating 16, provides a high degree of visibility to the scribed marking.

What is claimed is:

1. A microscope slide having a first side and a second side, said first side having an opaque, scratchable coating with a first color located generally at a marking region of said slide, and said second side having a contrastingly colored second coating generally positioned behind said opaque coating on said first side of said slide, whereby markings scratched into said first coating are highly visible when viewed from said first side and appear as markings of said second color against a background of said contrasting first color.

2. The slide of claim 1 wherein said scratchable coating of said first side of said slide is visually lighter in color than said coating on said second side of said slide for accepting markings on said scratchable coating with a conventional marker which are highly visible.

3. The slide of claim 1 wherein said scratchable coating can be removed with a generally pointed scribe.

4. The slide of claim 1 wherein said scratchable coating on said first side of said slide is a raised coating of resinous material including a granular medium, having a permanent matte finish for accepting and retaining a marking made with a conventional marker.

5. The microscope slide of claim 1 wherein said first side has a user identification mark spaced apart from said scratchable coating.

6. The microscope slide of claim 5 wherein said user identification mark is comprised of a resinous material including a granular medium having a permanent matte finish.

7. The microscope slide of claim 5 wherein said coating on said second side extends beyond said scratchable coating to a position generally behind said user identification mark.

8. The microscope slide of claim 1 wherein said first coating is pigmented.

9. The microscope slide of claim 1 wherein said second coating is pigmented.

10. The microscope slide of claim 1 wherein said first coating and said second coating are pigmented.

11. The microscope slide of claim 1, 2, 3, 4, 5, 6, 7, 8, 9, or 10 wherein said second coating on said second side is opaque.

12. A method of making a microscope slide that can be marked for identification, comprising:

applying an opaque, scratchable coating having a first color on a first side of a slide at a marking region of said slide; and applying a coating having a second color contrasting with said first color of the scratchable coating on a second side of said slide behind said scratchable coating.

13. The method of claim 12 wherein the first color-coating applying step includes applying a pigmented, opaque, scratchable coating contrasting with said second color of said second color-coating applying step.

14. The method of claim 12 wherein said second color-coating applying step includes applying a pigmented coating contrasting with said first color of said first color-coating applying step.

15. The method of claim 12 wherein said first color-coating applying step and said second color-coating applying step includes applying a pigmented coating to the first side and to the second side of said slide.

16. The method of claim 12 wherein said second color-coating applying step includes applying an opaque second color contrasting with said first color of said first color-coating applying step.

17. The method of claim 12 wherein the first color-coating applying step includes applying a scratchable coating having a first color lighter than said second color of said second color-coating applying step.

18. The method of claim 12 wherein said second color-coating applying step includes applying a coating having a second color lighter than said first color of said first color-coating applying step.

19. A method of making and marking a microscope slide, comprising:

applying an opaque, scratchable coating having a first color on a first side of a slide at a marking region of said slide;

applying a coating having a second color contrasting with said first color of the scratchable coating on a second side of said slide behind said scratchable coating; and scribing an identification mark into said scratchable coating whereby marks scratched into said scratchable coating are highly visible and appear as markings of said second color against a background of said contrasting first color.

20. The method of claim 19 wherein the first color-coating applying step includes applying a pigmented, opaque, scratchable coating contrasting with said second color of said second color-coating applying step.

21. The method of claim 19 wherein said second color-coating applying step includes applying a pigmented coating contrasting with said first color of said first color-coating applying step.

22. The method of claim 19 wherein said first color-coating applying step and said second color-coating applying step includes applying a pigmented coating to the first side and to the second side of said slide.

23. The method of claim 19 wherein said second color-coating applying step includes applying an opaque second color contrasting with said first color of said first color-coating applying step.

24. The method of claim 19 wherein the first color-coating applying step includes applying a scratchable coating having a first color lighter than said second color of said second color-coating applying step.

25. The method of claim 19 wherein the first color-coating applying step includes applying said scratchable coating and wherein the second color-coating applying step includes applying a coating contrasting with, and lighter in color than, said first color.

26. The method of claim 19 wherein the first color-coating applying step includes applying an opaque, lighter, resinous, granular coating which retains markings with a conventional marker, and marking said first color coating with a conventional marker so it has visible markings produced thereon with both a scribe and a conventional marker.

* * * * *